United States Patent

[11] 3,619,120

| [72] | Inventors | John R. Conlisk;<br>Clement A. Filliben, both of C/O Atlas Chemical Industries Inc., Wilmington, Del. 19899 |
|---|---|---|
| [21] | Appl. No. | 779,647 |
| [22] | Filed | Nov. 27, 1968 |
| [45] | Patented | Nov. 9, 1971 |

[54] DRYCLEANING PURIFIER
6 Claims, No Drawings

[52] U.S. Cl............................................ 8/142,
8/158, 210/40, 210/502, 252/163, 252/444
[51] Int. Cl............................................. D06l 1/04
[50] Field of Search.................................. 252/163,
364; 8/142, 158; 106/311; 210/39, 40, 266, 502, 505

[56] References Cited
UNITED STATES PATENTS

| 1,902,232 | 3/1933 | Haertel............. | 8/142 |
| 2,018,507 | 10/1935 | Alton................ | 8/142 |
| 3,212,641 | 10/1965 | Komarmy et al..... | 210/266 |
| 3,309,166 | 3/1967 | Moncada et al..... | 8/142 |

*Primary Examiner*—Leon D. Rosdol
*Assistant Examiner*—William E. Schulz
*Attorneys*—Kenneth E. Mulford and Roger R. Horton ABSTRACT: A purifier composition for drycleaning solvent is provided containing a major fraction of particles of activated carbon of intermediate size and a density equal to or greater than that of the drycleaning solvent in which used and a minor fraction of particulate material of substantially greater particle size, at least a part of which have a density less than that of drycleaning solvent used. Optionally, the minor fraction may also contain particles having a density greater than that of the drycleaning solvent used. The composition is adapted for use in the solvent systems of conventional drycleaning apparatus.

# DRYCLEANING PURIFIER

This invention relates to drycleaning purifier compositions. More particularly, this invention relates to a particulate composition of activated carbon suitable for use with conventional tubular filters of drycleaning apparatus. This invention further relates to a method for correcting or ameliorating the deleterious effects of defective filters of drycleaning apparatus.

Activated carbon is a well-known purifier for drycleaning solvents. In the past, two forms of activated carbon have been used for this purpose, to wit, powdered activated carbon and conventional granular carbon. Customarily, powdered activated carbon is added directly to the drycleaning solvent along with filter aid and these are then filtered out of the solvent onto filter screens, generally of the tubular type, and subsequently removed therefrom on a periodic basis along with insoluble dirt removed from the articles cleaned. Granular activated carbon, however, is customarily used by the placement thereof in a fixed container and passage of the filtered drycleaning solvent therethrough for purification. Each of the above-mentioned forms of activated carbon has specific advantages and disadvantages. For example, while powdered activated carbon is an efficient purifier of drycleaning solvent, its excessive dustiness is quite troublesome in a drycleaning plant. Moreover, should a break occur in the filter of the drycleaning apparatus, deposition of the powdered activated carbon on the articles being cleaned will ruin them. Conventional granular activated carbon, on the other hand, absorbs impurities more slowly from drycleaning solvent than does powdered activated carbon and not infrequently, especially when "dye bleeder" loads are run, supplemental additions of powdered activated carbon to the discolored drycleaning solvent are necessary for the effective purification thereof. In addition, the use of conventional granular carbon requires additional capital expenditure for drycleaning equipment adapted for such use.

The principal disadvantages attendant upon the use of both of the aforementioned forms of activated carbon have recently been resolved by the development of an intermediate form of activated carbon having a special mesh size, generally from about 40 mesh to about 140 mesh (U.S.S.). The particle size of an activated carbon conforming to such a mesh specification is coarse enough to be dust free but fine enough to exhibit an efficiency in the purification of drycleaning solvent comparable to that of powdered activated carbon. Accordingly, activated carbon having the aforementioned intermediate particle size is used in the manner conventional to the use of powdered activated carbon, i.e., it is introduced directly into the drycleaning solvent and filtered therefrom onto the screens of conventional tubular drycleaning filters. However, such tubular filters of drycleaning apparatus not infrequently develop breaks, especially near the top thereof, and because activated carbon having the intermediate particle size described tends to stay suspended in the solvent for a considerably longer period of time than powdered activated carbon, which is itself quickly deposited on the screen after entering the filter, such breaks in the filter are more apparent when an activated carbon of such intermediate particle size is used.

Accordingly, it is an object of this invention to provide an improved drycleaning purifier composition adapted to overcome the difficulties arising from a break in the tubular filters of drycleaning apparatus which attend the use of activated carbon having an intermediate particle size.

It is another object of this invention to provide method for elimination or substantial reduction of the deleterious effects of breaks in conventional tubular filters of drycleaning apparatus.

The foregoing objects and still further objects are broadly accomplished according to this invention by providing a drycleaning purifier composition which comprises in a major fraction thereof an activated carbon having a particle size intermediate that of powdered activated carbon, which is ordinarily sufficiently fine to pass through a mesh screen No. 325 (U.S. Bureau of Standards, Standard Screen Series, 1919) and that of conventional granular activated carbon ordinarily having a particle size ranging from about No. 8 mesh (U.S. Bureau of Standards, Standard Screen Series, 1919) to about No. 40 mesh, (U.S. Bureau of Standards, Standard Screen Series, 1919) and in a minor fraction thereof an activated carbon or other particulate material having a particle size which is substantially greater than the particle size of the activated carbon of said major fraction. Throughout this specification all references to mesh sizes, siene size and screen sizes are to be understood to be made to the U.S. Siene Series of the U.S. Bureau of Standards, Standard Screen Series, 1919.

Further, in accordance with this invention, said major fraction of said purifier composition comprises particles of activated carbon having a wet density equal to or greater than the density of the drycleaning solvent in which said activated carbon is used and said minor fraction of said purifier composition comprises, at least in part, particles of particulate material having a wet density less than the density of the drycleaning solvent in which said particulate material is used. Optionally, said minor fraction of said purifier composition may include in part particles of particulate material having a wet density which is greater than the density of the drycleaning solvent in which said particulate material is used. The term "wet density" when used with reference to activated carbon particles or other highly porous particles which absorb measurable quantities of moisture when immersed in drycleaning solvent, means the density of the "wetted" particle, i.e., the immersed particle, which, of course, is less than the normal density, i.e., the density prior to immersion, in the case of activated carbon, but which may be greater than the normal density of porous particulate materials which absorb water and are themselves normally less dense than water.

In accordance with this invention, the major fraction of the purifier composition comprising activated carbon particles of a size intermediate between the size of the particles of powdered carbon and the size of the particles of conventional granular carbon constitutes not less than about 85 percent by weight of the composition nor more than about 95 percent by weight of the composition while the minor fraction of the purifier composition of this invention comprising particles of particulate material of a size substantially greater than the size of the particles of said major fraction constitutes not more than about 15 percent by weight of the composition nor less than about 5 percent by weight of the composition.

Activated carbon particles comprising the major fraction of the purifier composition of this invention having a size which is intermediate the size of particles of activated powdered carbon and the size of particles of conventional granular carbon are defined for the purposes of this specification as particles having a size such that the particles will pass through the orifices of the mesh of a U.S. Bureau of Standards, standard screen No. 40 but will not pass through the orifices of the mesh of a U.S. Bureau of Standards, standard screen No. 140.

Particles of particulate material comprising the minor fraction of the purifier composition of this invention having a size substantially greater than the size of the particles of the major fraction are defined for the purposes of this specification as particles having a size such that the particles will pass through the orifices of a United States Sieve Series mesh screen No. 4 but will not pass through the orifices of a United States Sieve Series mesh screen No. 12.

The drycleaning solvents for the purification of which the purifier composition of the present invention is suitable are those synthetic and petroleum drycleaning solvents in ordinary commercial use. Of these, the only synthetic drycleaning solvent of significance is perchlorethylene, which has a density of about 1.62 grams/ml. The petroleum drycleaning solvent in commonest use is Stoddard solvent, having a density of about 0.78 grams/ml. Other petroleum solvents which may be used have densities not far from that of Stoddard solvent and may range from about 0.75 grams/ml. to about 0.8 grams per ml.

Accordingly, the drycleaning solvents, the purification of which is contemplated by the purifier composition of this invention, will have densities within the range of about 0.75 grams/ml. to about 1.65 grams/ml.

Since in accordance with this invention the major fraction of the purifier composition thereof necessarily comprises particles of activated carbon having a density equal to or greater than the drycleaning solvent in which used, the average density of said particles is never less than about 0.75 grams/ml., preferably somewhat greater. As a practical matter, the average density of the said particles of the activated carbon of the major fraction of the purifier composition of the present invention should preferably be not less than about 1.62 grams/ml., thereby adapting said purifier composition to use with all of the drycleaning solvents in commercial use generally.

Conversely, since the minor fraction of the purifier composition of this invention necessarily comprises particles of particulate material having a density less than the density of the drycleaning solvent in which used, the average density of said particles is always less than about 1.62 grams/ml. Again as a practical matter, the average density of the said particles of the particulate material of the minor fraction of the purifier composition of the present invention should preferably be less than about 0.75 grams/ml., thereby adapting said purifier composition to use with all of the drycleaning solvents in ordinary commercial use.

Optionally, the minor fraction of the purifier composition of this invention may also contain, however, particles of particulate material of the size hereinbefore specified which have an average density greater than the density of the drycleaning solvent in which used. Accordingly, the said minor fraction of the purifier composition may contain particles having a density greater than 1.62 grams/ml.

While the said minor fraction of the purifier composition of this invention, which may comprise as little as 5 percent by weight of the purifier composition and as much as 15 percent by weight of said composition may be comprised entirely of particles of particulate material having a density less than the drycleaning solvent in which used, not less than about one-third of said minor fraction is necessarily comprised of particles of particulate material having a density less than the drycleaning solvent in which used. Accordingly, not less than about 5 percent by weight of the purifier composition of the present invention is comprised of particles of particulate material having an average wet density less than the density of the drycleaning solvent used, i.e., less than about 1.62 grams/ml. and preferably less than about 0.75 grams/ml.

While the major fraction of the purifier composition of the present invention necessarily comprises particulate activated carbon of the size and density hereinbefore specified for said major fraction and although the minor fraction of said purifier composition also preferably contains particulate activated carbon of the size and densities specified for said minor fraction, the said minor fraction of the said purifier composition need not necessarily comprise activated carbon particles but may, on the contrary, contain instead of activated carbon particles, or in addition thereto, particulate materials of a different character and composition. Illustrative of materials which may be contained in said minor fraction of said purifier composition in particulate form are paper; cork; wood; plastics, including foamed plastics; hemp; sisal; jute and other natural fibers; cinders and ceramic materials of suitable density as well as other materials. Examples of particulate materials other than activated carbon which have a density lower than the synthetic and petroleum solvents in common commercial use, that is a density lower than about 0.75 grams/ml., are particulate foamed plastics, particulate cork and particulate wood. Examples of particulate materials other than activated carbon having a density greater than the synthetic and petroleum drycleaning solvents in ordinary commercial use, i.e., greater than about 1.62 grams/ml., are particulate high-density plastics, as, for example, plastics impregnated with a high-density material; particulate glass; particulate stone; particulate heavy ceramics and particulate metal, as metal turnings.

Ordinarily in the practice of this invention, the purifier composition thereof is used in the solvent systems of drycleaning apparatus supplied with a filter system of the conventionally tubular type. Typical examples of this type of drycleaning filter are PER-MITE and PER Crporation filters manufactured and sold by PER Corporation, Orange, New Jersey.

After extensive use tubular filters of the kind with which the purifier composition of the present invention is adapted for use may develop breaks or holes in the tubular screens thereof, especially near the top thereof, thereby affording an opportunity for activated carbon particles of intermediate size, as defined hereinbefore and which tend to remain suspended in the drycleaning solvent for substantial periods of time, to pass through the filter and deposit on the articles being drycleaned. In the practice of the present invention, however, the larger particles of particulate material contained in the minor fraction of the purifier composition of this invention, which has previously been introduced into the solvent system of the drycleaning apparatus, are deposited on the tube walls and plug the breaks or block the holes therein, thereby preventing the activated carbon particles of intermediate size from passing therethrough.

It will be apparent that the larger particles of the minor fraction of said purifier composition having a density less than that of the drycleaning solvent in which the composition is used tend to plug the holes in the tubular filter near the top thereof while the larger particles of the minor fraction which may have a density greater than that of the drycleaning solvent in which used tend to plug the holes or breaks in the filter nearer the bottom thereof.

The following is a specific example of the purifier composition of the present invention and the manner of its use:

EXAMPLE 1

| Ingredient | % by Weight |
| --- | --- |
| a. Activated carbon particles [Mesh size: U.S.S. No. 40 to U.S.S. No. 140; average wet density: 1.9 grams/ml.] | 95 |
| b. Activated carbon particles λMesh size: U.S.S. No. 4 to U.S.S. No. 12; average wet density: 1.55 grams/ml.] | 5 |

A filter tube (flexible type) of a glass filter was made defective by deforming the tube to provide several breaks near the top thereof approximately one-sixteenth inch by one-eighth inch in dimension. Thereafter the defective tube was placed in the filter apparatus and perchlorethylene drycleaning solvent was arranged to circulate therethrough in the manner normal to the solvent systems of conventional drycleaning apparatus. Thereafter, the purifier composition was added to the perchlorethylene solvent along with filter aid in the conventional manner. The particles of the minor fraction of the purifier composition were observed to float in the perchlorethylene solvent while the particles of the major fraction were observed to be suspended therethrough. When the filter apparatus was started, the large, light particles of the minor fraction of the purifier composition were carried promptly to the holes of the defective filter tube and effectively blocked the passage therethrough of the smaller, denser particles of the major fraction of the purifier composition, as evidenced by the fact that the filtered solvent became clear after about 7 minutes of the operation of the filter whereas normally, using only particles of the same size and density as those contained in the said major fraction of the composition, the drycleaning solvent did not clear for more than 40 minutes.

The following are further examples of the purifier composition as provided in accordance with this invention:

EXAMPLE 2

| Ingredient | % by weight |
| --- | --- |
| a. Activated carbon particles [Mesh size: U.S.S. No. 40 to U.S.S. No. 140; average wet density: 1.9 grams/ml.] (1) | 90 |
| b. Activated carbon particles [Mesh size: U.S.S. No. 4 to U.S.S. No. 12; average wet density: 1.55 grams/ml.] (2) | 5 |
| c. Activated carbon particles [Mesh size: U.S.S. No. 4 to U.S.S. No. 12; average wet density: 2.0 grams/ml.] (3) | 5 |

EXAMPLE 3

| Ingredient | % by Weight |
| --- | --- |
| a. Activated carbon particles [Mesh size: U.S.S. No. 40 to U.S.S. No. 140; average wet density 1.9 grams/ml.] (1) | 85 |
| b. Activated carbon particles [Mesh size: U.S.S. No. 4 to U.S.S. No. 12; average wet density 1.55 grams/ml.] (2) | 10 |
| c. Cinder particles [Mesh size: U.S.S. No. 4 to U.S.S. No. 12; average density in excess of 1.62 grams/ml.] | 5 |

EXAMPLE 4

| Ingredient | % by Weight |
| --- | --- |
| a. Activated carbon particles [Mesh size: U.S.S. No. 40 to U.S.S. No. 140; average wet density 1.9 grams/ml.] (1) | 95 |
| b. Foamed plastic particles [Polyurethane foam; Mesh size: U.S.S. No. 4 to U.S.S. No. 12; average density less than 0.75 grams/ml.] | 5 |

EXAMPLE 5

| Ingredient | % By Weight |
| --- | --- |
| a. Activated carbon particles [Mesh size: U.S.S. No. 40 to U.S.S. No. 140; average wet density 1.9 grams/ml.] (1) | 90 |
| b. Foamed plastic particles [Polyurethane foam; Mesh size: U.S.S. No. 4 to U.S.S. No. 12; average density less than 0.75 grams/ml.] | 5 |
| c. Cinder particles [Mesh size: U.S.S. No. 4 to U.S.S. No. 12; average density in excess of 0.75 grams/ml.] | 5 |

1.

DARCO CRYSTALS, manufactured and sold by Atlas Chemical Industries, Inc. Wilmington, Delaware

2.

DARCO K, manufactured and sold by Atlas Chemical Industries, Inc., Wlmington, Delaware

3.

Granular DARCO, manufactured and sold by Atlas Chemical Industries, Inc., Wlmington, Delaware Although this invention has been described with reference to specific embodiments thereof including specific chemical materials and specific proportions, it will be apparent that other equivalent materials may frequently be used and substituted for those described and the proportions of materials varied, all within the spirit and the scope of this invention as defined in the appended claims.

Having thus described my invention, I claim:

1. A composition of matter for purification of a drycleaning solvent comprising as a major fraction thereof from about 85 percent to about 95 percent by weight of said composition of activated carbon particles having a size such that said particles pass through a U.S.S. No. 40 mesh sieve but do not pass through a U.S.S. No 140 mesh sieve and have a density equal to or greater than that of the drycleaning solvent in which used and as a minor fraction thereof from about 5 percent to about 15 percent by weight of said composition of a particulate material having a particle size such that said particles pass through a U.S.S. No. 4 mesh sieve but do not pass through a U.S.S. No. 12 mesh sieve, at least about 5 percent by weight of said total particles having a density less than that of the drycleaning solvent in which used.

2. A composition according to claim 1 wherein at least about 5 percent by weight of said total particulate material has a density greater than that of said drycleaning solvent and a particle size such that the particles pass through a U.S.S. No. 4 mesh sieve but do not pass through a U.S.S. No. 12 mesh sieve.

3. A composition according to claim 1 wherein said particulate material of said minor fraction is selected from the group consisting of activated carbon, paper, wood, cork, plastics, natural fibers, cinders, ceramic material and metal.

4. A composition according to claim 1 wherein said particulate material of said minor fraction is activated carbon.

5. A method of purifying drycleaning solvent contained in the solvent system of drycleaning apparatus having a tubular filter device which comprises the step of introducing into said drycleaning solvent in said solvent system a composition comprising as a major fraction thereof from about 85 percent to about 95 percent by weight of said composition of activated carbon particles having a size such that said particles pass through a U.S.S. No. 40 mesh sieve but do not pass through a U.S.S. No. 140 mesh sieve and have a density equal to or greater than that of the drycleaning solvent in which used and as a minor fraction thereof from about 5 percent to about 15 percent by weight of said composition of a particulate material having a particle size such that said particles pass through a U.S.S. No. 4 mesh sieve but do not pass through a U.S.S. No. 12 mesh sieve, at least about 5 percent by weight of said total particles having a density less than that of the drycleaning solvent in which used.

6. A method of claim 5 wherein the drycleaning solvent is selected from the group consisting of perchloroethylene and Stoddard solvent.

* * * * *

PO-1050
(5/69)

UNITED STATES PATENT OFFICE
CERTIFICATE OF CORRECTION

Patent No. 3,619,120          Dated November 9, 1971

Inventor(s) John R. Conlisk and Clement A. Filliben

It is certified that error appears in the above-identified patent and that said Letters Patent are hereby corrected as shown below:

Column 4, line 5, delete "PER Crporation" and insert -- PER FLEX --.

Signed and sealed this 1st day of May 1973.

(SEAL)
Attest:

EDWARD M. FLETCHER, JR.
Attesting Officer

ROBERT GOTTSCHALK
Commissioner of Patents